United States Patent
Naseef et al.

(10) Patent No.: US 11,323,352 B2
(45) Date of Patent: May 3, 2022

(54) TEST SYSTEM AND TEST METHOD (71) Applicant: Rohde & Schwarz GmbH & Co. KG, Munich (DE)

(72) Inventors: Mahmud Naseef, Planegg (DE); Christian Reimer, Haag i. OB. (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 21 days.

(21) Appl. No.: 16/261,911

(22) Filed: Jan. 30, 2019

(65) Prior Publication Data
US 2020/0244564 A1 Jul. 30, 2020

(51) Int. Cl.
| H04L 12/28 | (2006.01) |
| H04L 43/50 | (2022.01) |
| H04W 16/28 | (2009.01) |
| H04W 76/10 | (2018.01) |
| H04W 24/08 | (2009.01) |

(52) U.S. Cl.
CPC ............. *H04L 43/50* (2013.01); *H04W 16/28* (2013.01); *H04W 24/08* (2013.01); *H04W 76/10* (2018.02)

(58) Field of Classification Search
CPC ..................................................... H04W 76/10
See application file for complete search history.

(56) References Cited

U.S. PATENT DOCUMENTS

| 7,437,128 | B1 * | 10/2008 | Fessler | H04B 17/345 455/222 |
| 8,229,344 | B1 | 7/2012 | Petersen et al. | |
| 8,780,968 | B1 * | 7/2014 | Garcia | H04W 72/0446 375/228 |
| 8,811,192 | B2 * | 8/2014 | Luong | H04W 24/06 370/245 |
| 8,995,926 | B2 * | 3/2015 | Mow | H04B 17/318 455/67.14 |
| 9,000,989 | B2 * | 4/2015 | Nickel | G01R 29/10 343/703 |
| 9,084,124 | B2 * | 7/2015 | Nickel | H04B 17/12 |
| 9,337,941 | B2 * | 5/2016 | Emerson | H01Q 21/0087 |
| 9,614,627 | B2 * | 4/2017 | Yu | H04B 17/0085 |
| 9,743,297 | B1 * | 8/2017 | Jackson | H04B 17/3912 |
| 9,955,371 | B1 * | 4/2018 | Koebele | H04W 56/0025 |
| 10,033,473 | B1 * | 7/2018 | Kyrolainen | H04B 17/15 |
| 10,375,586 | B2 * | 8/2019 | Breiter | H04W 24/06 |
| 10,558,378 | B2 * | 2/2020 | Fujimoto | G11C 16/30 |
| 10,574,369 | B2 * | 2/2020 | Jing | H04B 17/102 |
| 10,613,198 | B2 * | 4/2020 | Vacanti | G01R 29/105 |
| 10,749,783 | B2 * | 8/2020 | Kumar | H04B 17/17 |
| 2007/0091814 | A1 * | 4/2007 | Leung | H04L 1/243 370/252 |
| 2008/0274702 | A1 * | 11/2008 | Keller | H04B 17/345 455/67.13 |

(Continued)

*Primary Examiner* — Guang W Li (74) *Attorney, Agent, or Firm* — Westman, Champlin & Koehler, P.A.

(57) ABSTRACT

System and method for testing a device under test via a wireless communication link. When testing the device under test, an interference signal may be applied to the test scenario. The generation of the interference signal may be controlled based on a monitoring of a frequency spectrum in the test scenario, in particular a frequency spectrum at the device under test. In this way, a more realistic test scenario can be achieved.

18 Claims, 3 Drawing Sheets

(56) References Cited

U.S. PATENT DOCUMENTS

| | | | |
|---|---|---|---|
| 2009/0135754 A1* | 5/2009 | Yavuz | H04W 52/20 370/311 |
| 2012/0139571 A1* | 6/2012 | Nickel | G01R 29/0821 324/750.26 |
| 2013/0044033 A1* | 2/2013 | Nickel | G01R 29/10 343/703 |
| 2013/0109446 A1* | 5/2013 | Phillips | H04B 17/29 455/575.1 |
| 2014/0051363 A1* | 2/2014 | Kennedy | H04W 24/00 455/67.11 |
| 2014/0087668 A1* | 3/2014 | Mow | H04W 24/08 455/67.14 |
| 2014/0254392 A1* | 9/2014 | Wolcott | H04B 17/345 370/242 |
| 2016/0226740 A1* | 8/2016 | Van Oost | H04W 24/08 |
| 2017/0126336 A1* | 5/2017 | Strohmeier | H04B 17/345 |
| 2017/0264469 A1* | 9/2017 | Otani | H04L 25/0214 |
| 2018/0219761 A1* | 8/2018 | Kumar | H04L 43/18 |
| 2021/0270884 A1* | 9/2021 | Wetherbee | G01R 31/002 |

\* cited by examiner

TEST SYSTEM AND TEST METHOD

TECHNICAL FIELD

The present invention relates to a test system. The present invention further relates to a test method.

BACKGROUND

Although applicable in principle to any wireless test system, the present invention and its underlying problem will be hereinafter described in combination with testing a wireless communication device.

The use of wireless communication devices increases continuously with the advance of high speed wireless data communications. During development or production of devices for communication systems it is necessary to thoroughly test devices for compliance with communication standards. In this context tests have to be applied against interferences or disturbing signals. For example, continuous wave jamming signals may be applied having a constant signal strength. However, such continuous wave signals may only reflect real scenarios to a limited extent.

Against this background, a problem addressed by the present invention is to provide a versatile test system for testing wireless devices against interfering signals. In particular, the present invention aims to provide a test system which can achieve an improved and realistic testing of wireless devices against disturbances such as interfering signals.

SUMMARY

The present invention solves this problem with a test system and test method with the features of the independent claims. Further advantageous embodiments are subject matter of the dependent claims.

According to a first aspect, a test system for testing a device under test is provided. The test system comprises a test device, a spectrum measurement device, an interfering device and an interference controller. The test device is configured to establish a wireless communication link with the device under test. The spectrum measurement device is configured to monitor a frequency spectrum in a predefined frequency band. The interfering device is configured to generate an interference signal. The interfering device is further configured to emit the interference signal to the device under test. The interference controller is configured to control the generation of the interference signal by the interfering device. In particular, the generation of the interference signal is controlled based on the frequency spectrum monitored by the spectrum measurement device.

According to a further aspect, a method for testing a device under test is provided. The test method comprises a step of establishing a wireless communication link between a device under test and the test device. The method further comprises monitoring a frequency spectrum in a predefined frequency band. In particular, the monitoring may be performed by a spectrum measurement device. Further, the method comprises generating an interference signal and emitting the interference signal to the device under test. The generation of the interference signal and the emitting of the interference signal may be performed by an interfering device. Finally, the method comprises a step of controlling the generation of the interference signal by the interfering device. The controlling may be performed based on the frequency spectrum monitored by the spectrum measurement device. In particular, the controlling may be performed by an interference controller.

The present invention is based on the finding that a testing of wireless devices against interfering signals may be easily performed based on continuous wave signals having fixed, predetermined properties such as frequency signal strength or the like. However, such fixed continuous wave signals may reflect real scenarios only to a limited extent. Thus, tests based on fixed continuous wave signals for testing the robustness of a wireless device against interferences may have only a limited significance. Furthermore, a relative high signal strength of the interfering signal may be required when testing the robustness of a wireless device against interfering signals.

The present invention therefore takes into account this finding and aims to provide an improved, more realistic and more reliable testing of wireless devices against interfering signals. It is for this purpose that the test system and the test method according to the present invention use a feedback loop for controlling interference signals applied to the device under test. In this way, the interfering device do not only provide a more or less constant interfering signal to the device under test. Moreover, a frequency spectrum in a specific frequency band, e.g. the frequency band in which the device under test is operating, may be measured, and the measured frequency spectrum may be used for controlling the generation of the interfering signals applied to the device under test.

In this way, it is possible to take into account the impact of the wireless signals applied to the device under test, for example signal strength and/or related frequencies, when applying interfering signals to the device under test. Thus, the related parameters, for example frequency, signal strength or the like may be adapted depending on the respective measurements. Accordingly, the generation of the interfering signals can be easily adapted in an appropriate manner such that the interfering signals are in a desired relationship with respect to the respective wireless signals in the communication link between the device under test and a test device for testing the device under test. In this way it is possible to adapt the applied interference signals dynamically when testing a wireless communication device. In particular, the test parameters, especially the interfering signals, can be adapted in a very good manner such that the test parameters fit desired properties, for example to simulate real scenarios.

The test device may be any appropriate device for applying a test to a device under test, in particular testing a wireless communication device. For this purpose, the test device may establish a wireless communication link between the test device and the device under test. The wireless communication link may be, for example a wireless communication link of a mobile communication such as GSM, UMTS, LTE, 5G or the like. Furthermore, the wireless communication link may be a communication link based on a Bluetooth standard, WiFi, ZIGBEE or any other communication standard. However, a wireless communication link based on a proprietary communication protocol may be possible, too. The communication link may comprise transmissions from the test device to the device under test and/or transmissions from the device under test to the test device. The test device may apply any appropriate test, for example analyzing a bit error rate, or any other operation of the device under test. For example, the test device may apply tests for analyzing the response of the device under test based on a modification of the signal strength, a change of a communication channel, etc. It is understood that the present invention is not limited to any specific tests performed by the test device.

Furthermore, a spectrum measurement device is used for monitoring a frequency spectrum in a predetermined frequency range. For example, the predetermined frequency range may relate to a frequency range according to a particular communication standard. In particular, the frequency range may relate to a frequency range which may be used by the test device and/or the device under test during the applied test procedure. However, it is understood that any other appropriate frequency range for monitoring the frequency spectrum may be also possible.

The spectrum measurement device may determine a signal strength for each frequency or frequency band in the monitored frequency range. For example, the spectrum measurement device may be a spectrum analyzer or the like.

As it is described in more detail below, the spectrum measurement device may measure, for example the spectrum of signal measured at the device under test or the signal measurement device may measure a spectrum of signals at the test device.

Testing the device under test may comprise testing an impact of interferences to the operation of the device under test. For this purpose, an interference signal may be generated by the interfering device and the generated interference signal may be emitted to the device under test. In particular, the interference signal may be emitted to the device under test as a wireless signal. For example, the interference signal may be emitted to the device under test by a test antenna which is connected to the interfering device. However, it may be also possible to mix the generated interference signal and the test signals provided by the test signal, for example by a combiner, and to provide the combination of the test signal and interference signal to the device under test by a common antenna. Any other appropriate approach for providing the generated interference signal to the device under test may be possible, too.

The interference signal may be any kind of signal for applying interferences. Appropriate examples for interference signals may be described in more detail below. For example, the interference signal may comprise a noise signal, a pulsed signal, a signal comprising multiple frequencies or any other kind of interference signal. In particular, the interference signal may be a jamming signal, i.e. a signal for disturbing a communication between the device under test and a communication partner such as the test device.

The properties of the interference signal may change during the test. In particular, one or more characteristic parameters of the interference signal may be adapted. In particular, the generation of the interference signal and the setting of one or more characteristic parameters of the interference signal may be controlled by the interference controller.

The interference controller may be communicatively coupled with the spectrum measurement device and receive the monitored frequency spectrum from the spectrum measurement device. Based on the monitored frequency spectrum, the interference controller may set and/or change a number of one or more characteristic parameters of the interference signal generated by the interfering device. Examples of characteristic parameters for setting the interfering device will be described in more detail below. For example, a signal strength, a frequency or frequency band or a number of frequencies, a bandwidth or any other appropriate parameter for configuring the generation of the interference signal may be set or modified by the interference controller. In particular, the parameters may be set or modified based on the frequency spectrum measured by the spectrum measurement device.

The test device, the spectrum measurement device, the interfering device and/or the interference controller may comprise, for example, a general purpose processor with corresponding instructions. Furthermore, the devices may comprise interfacing elements which are coupled to the respective processor, receive signals and provide the received signals to the respective processor. Such interfacing elements may comprise, for instance, analog to digital converters for converting signals into digital data that may be processed by a processor. Furthermore, the devices may comprise analog elements like filters including resistors, capacitors or inductors or the like.

Further embodiments of the present invention are subject of further subclaims and the following description referring to the drawings.

In a possible embodiment, the predefined frequency band corresponds to a specific frequency band of a communication standard. For example, the predefined frequency band may correspond to specific frequency bands of GSM, UMTS, LTE, 5G etc. The specific frequency bands may also relate to a specific frequency band of WIFI, Bluetooth, ZIGBEE or the like. However, it may be also possible to specify any other appropriate frequency band of an existing, upcoming or proprietary communication protocol.

In a possible embodiment, the spectrum measurement device is configured to monitor a frequency spectrum of a signal received or emitted by the test device. Accordingly, the spectrum measurement device may measure the respective signals at the test device in order to determine frequency components and related signal levels at the test device. In this way, the interfering signals may be set or adapted according to the respective signal conditions at the test device. A wired connection by means of cable or the like may be used for forwarding the signals from the test device to the spectrum measurement device. For example, a splitter may be used for extracting signal from the test device and forward the extracted signals to the spectrum measurement device. Furthermore, it may be also possible to receive the respective signals from the test device by an antenna.

In a possible embodiment, the spectrum measurement device is configured to monitor a frequency spectrum of a signal received or emitted by the device under test. In this way, the spectrum measurement device may monitor the signal conditions, in particular the radio frequency conditions at the location of the device under test. As already described above in connection with the measurement of the spectrum at the position of the test device, it may be also possible to measure the frequency spectrum at the device under test by a wired link between the device under test and the spectrum measurement device. Alternatively, it may be also possible to measure the radio frequency spectrum by a test antenna receiving wireless signals, in particular radio frequency signals at the respective position.

In a possible embodiment, the interfering device is configured to generate a modulated interference signal. For this purpose, any kind of appropriate modulation for generating the interference signal may be possible. For example, an amplitude and/or frequency modulation may be applied. Furthermore, the interference signal may be a pulsed signal. It may be also possible to apply an interference signal comprising noise. Hence, any appropriate kind of interfering signal may be applied. In particular, the generated interference signal may be different from a continuous wave signal.

In other words, the generated interference signal may be any kind of signal which is different from a signal comprising only a continuous single frequency.

In a possible embodiment, the interference controller is configured to control at least one of the following parameters: frequency, occurrence, bandwidth, or signal level of the interference signal. In particular, the interference controller may control the parameters based on the frequency spectrum measured by the spectrum measurement device. Accordingly, the frequency of the generated interference signal may be set or modified depending on frequencies detected in the measured spectrum. Furthermore, the occurrence, i.e. the existence of a specific component in the interference signal may be set depending on the measured spectrum. Furthermore, the bandwidth or the signal level of the interference signal may be also set or modified based on the frequencies or the level of particular frequencies in the measured spectrum.

In a possible embodiment, the test system comprises an antenna. The antenna may be configured to emit the generated interference signal to the device under test. Furthermore, the test system may comprise a beamforming device. The beamforming device may be configured to form a beam of the antenna which emits the generated interference signal. In this way, the direction of the emitted interference signal may be controlled based on the beamforming. For example, the antenna may comprise an antenna system comprising multiple antenna elements, and the individual antenna elements are provided with individual signals such that a desired beamforming can be achieved. However, it is understood that any other approach for beamforming may be possible, too.

In a possible embodiment, the interference controller is configured to control the beamforming of the beamforming device based on the monitored frequency spectrum. For example, the beamforming may be adapted depending on the amplitude of one or more specific frequencies in the monitored frequency spectrum or depending on a detection of one or more specific frequencies in the spectrum.

In a possible embodiment, the test system may comprise a moveable platform. The moveable platform may be configured to carry the interfering device or at least an antenna for emitting the interference signals to the device under test. The moveable platform may be, for example, a moveable structure comprising one or more axes for carrying the interfering device in a two-dimensional or three-dimensional space. For example, a number of linear axes or rotating axes may be provided on the moveable structure. The moveable platform may be driven by an electric motor or the like.

Alternatively, the moveable structure may be a highly moveable platform such as a plane, a quadrocopter, a drone or a vehicle. However, it is understood that any other kind of moveable platform for carrying the interfering device may be possible, too.

With the present invention it is therefore now possible to provide interferences to a device under test, wherein the interferences can be precisely tuned to a desired test scenario. In particular, by measuring a frequency spectrum in the test scenario, the generation of the interference signal can be set according to the measured frequency spectrum. In this way, the generated interferences may fit very precisely to the operation of the device under test. In this way, the generation of the interference signals can be limited to appropriate frequencies, and the generation of unnecessary interferences can be omitted. Thus, the required power for generating interferences can be reduced. Furthermore, by precisely adapting the generation of interferences to the measurement scenario, real world scenarios can be simulated more detailed. In this way, the testing of a device under test by applying interference signals can be improved.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown in scale.

In a drawing, same, functionally equivalent and identical operating elements, features and components are provided with same reference signs in each case, unless stated otherwise.

DETAILED DESCRIPTION OF THE DRAWINGS

Figure 1:
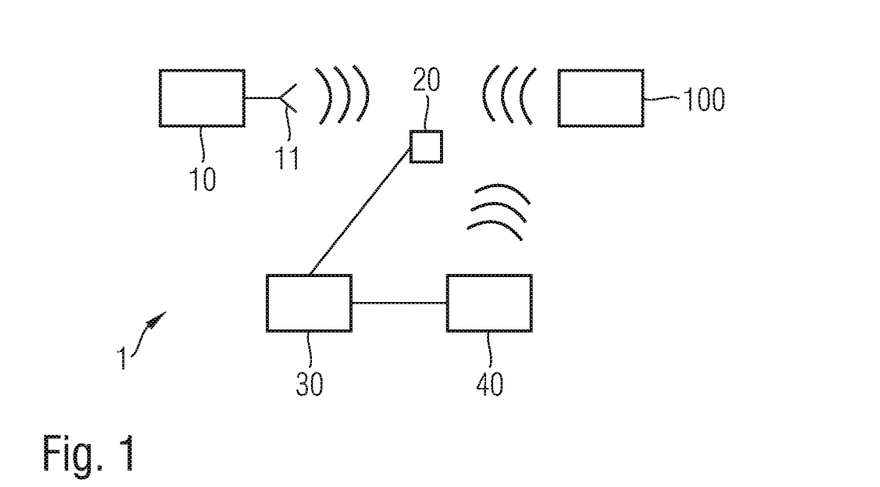
FIG. 1 shows a block diagram of a test system according to an embodiment of the present invention.

FIG. 1 shows a block diagram of an embodiment of a test system 1. The test system 1 comprises a test device 10 for establishing a wireless communication link with a device under test 100. Accordingly, test device 10 may perform any kind of test based on the established communication link. Test device 10 may comprise an antenna 11 for emitting wireless signals to the device under test 100 and for receiving wireless signals from the device under test 100.

For example, device under test 100 may be a wireless communication device. In particular, device under test 100 may be a mobile use equipment such as a mobile phone or the like. Furthermore, device under test 100 may be a component of a wireless communication system, for example a base station or a component of a base station. Device under test 100 may also be any other kind of device for applying a wireless communication, for example an internet of things device, an access point or a station of a WIFI network or any other device for applying a wireless communication.

In particular, test device 10 may test the device under test 100 in a configuration when disturbances or interferences are applied. For this purpose, an interfering device 40 may generate an interference signal and emit the generated interference signal. In particular, the generated interference signal may be emitted in the direction of the device under test 100. For example, the interference signal may be emitted as a wireless signal. The wireless interference signal may be emitted, for example by an antenna or antenna system. For example, interfering device 40 may comprise an antenna for emitting the interfering signals. This will be described in more detail below. Furthermore, the generation of the interference signal will be also described in more detail below.

The test system 1 further comprises a spectrum measurement device 20. Spectrum measurement device 20 may monitor a frequency spectrum in a predetermined frequency band. For example, the predetermined frequency band on which the spectrum measurement device 20 measures the frequency spectrum may relate to a frequency band which is used by the device under test 100. For example, the predetermined frequency band may be determined based on a communication standard or a communication protocol which is used by the device under test 100, in particular by the wireless communication link which is established between the device under test 100 and the test device 10.

For example, an appropriate frequency range may be specified by a user in advance. Alternatively, it may be also possible to specify a desired frequency range in accordance with a specific test scenario which is executed by the test system 1. For example, the relevant parameters may be stored in a memory of the test device 10 or the spectrum measurement device 20, and the spectrum measurement device 20 is automatically configured based on the predetermined parameters. Furthermore, it may be also possible to communicatively couple the test device 10 and the spectrum measurement device 20. Thus, the frequency range which is monitored by the spectrum measurement device 20 may be automatically configured based on the configuration of the test device 10. For example, test device 10 may set the frequency range which is monitored by the spectrum measurement device 20 based on a currently executed test procedure.

Spectrum measurement device 20 may measure the frequency spectrum in the predefined frequency band in order to determine the signal strength of frequencies or frequency bands in the monitored frequency range. For example, spectrum measurement device 20 may be spectrum analyzer or the like.

Spectrum measurement device 20 may monitor the frequency spectrum of signals, in particular radio frequency signals at the position of the device under test 100. For example, a probe or a measurement antenna may be located at the spatial position close to the device under test 100.

Furthermore, spectrum measurement device 20 may monitor the frequency spectrum of signals, in particular radio frequency signals at the position of the test device 10. For this purpose, a probe or a measurement antenna may be located at the spatial position of the test device 10. It may be also possible to apply a wired connection between the test device 10 and the spectrum measurement device 20. For example, a splitter may be arranged between an output port of test device 10 and a test antenna 11 for emitting signals to the device under test 100 and/or receiving signals from the device under test 100. Accordingly, the respective signal may be provided to the spectrum measurement device 20 for determining the frequency spectrum.

The determined frequency spectrum may be provided from the spectrum measurement device 20 to an interference controller 30. For this purpose, spectrum measurement device 20 may be communicatively coupled with interference controller 30. Based on the data of the measured frequency spectrum which are provided from spectrum measurement device 20, interference controller 30 may control the operation of interfering device 40. This will be described in more detail below.

Interfering device 40 generates interference signals and emits the generated interference signals to device under test 100. For example, the interference signals may be emitted by an antenna or antenna system as will be described in more detail below.

Even though it may be possible to emit continuous wave signals as interference signals to device under test 100, interfering device 40 may preferably emit noise signals or modulated signals. For example, amplitude and/or frequency of the interfering signal may be modulated. However, it is understood that any other kind of modulation, for example modulation of a phase of the signal, may be possible, too. Furthermore, interfering signal may be pulsed or switched on and off based on a specific scheme. Any other manner of modifying the interference signal may be possible, too. Furthermore, the frequency of the interference signal, the bandwidth of the interference signal or any other parameter of the interference signal may be set or adapted in an appropriate manner. In particular, the interference signal may be controlled based on the frequency spectrum monitored by spectrum measurement device 20.

For controlling the operation of the interfering device 40, interfering device 40 may be communicatively coupled with interference controller 30. Accordingly, interference controller 30 may configure interference device 40 and/or set one or more parameters of interfering device 40 in order to adapt or modify the generation of the interference signal by interfering device 40.

For controlling the operation of interfering device 40, interference controller 30 may take into account the frequency spectrum provided by spectrum measurement device 20. For example, if a specific frequency is detected in the frequency spectrum, interference controller 30 may cause interfering device 40 to generate an interference signal accordingly. For example, the frequency of the interference signal may correspond to the frequency in the spectrum provided by spectrum measurement device 20. Furthermore, it may be possible that the frequency of the interference signal may be shifted based on a predetermined offset or based on one or more frequencies in the monitored frequency spectrum. Alternatively, the bandwidth of the interference signal may be adapted based on one or more frequencies in the monitored frequency spectrum. However, any other parameter of the generated interference signal may be also adapted based on the monitored frequency spectrum. For example, it may be also possible to control an amplitude of an interference signal generated by interfering device 40 based on the monitored frequency spectrum. Furthermore, an occurrence, i.e. switching on or off, of an interference signal may be controlled based on the monitored frequency spectrum. However, it is understood that any other setting of the generation for interference signal may be also adapted based on the monitored frequency spectrum.

Furthermore, the configuration of the interfering device 40 which has been provided by interference controller 30 may be also provided to test device 10. In this way, test device 10 can take into account the parameters of the generated interference signal when evaluating the test procedure and analyzing the result of the respective test.

Figure 2:
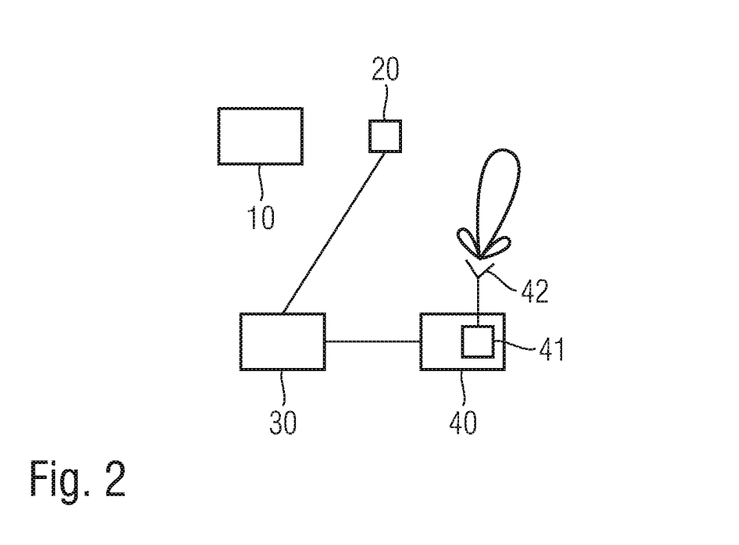
FIG. 2 shows a block diagram of a test system according to another embodiment.

FIG. 2 shows a further embodiment of a test system 1. The test system 1 according to FIG. 2 mainly corresponds to the previously described embodiment. Thus, the explanation as provided above, also applies to the test system 1 in FIG. 2.

As can be further seen in FIG. 2, the interference signal may be emitted by an antenna 42. In particular, antenna 42 may comprise one or more antenna elements. Furthermore, the radiation pattern, i.e. the antenna beam of the antenna 42 may be controlled by a beamforming device 41. For example, antenna 42 may comprise multiple antenna elements, and each antenna element of antenna 42 may be provided with an individual signal. in this way a desired antenna pattern can be achieved. However, any other approach for controlling the antenna pattern for the radiation beam may be possible, too. In particular, the antenna beam of antenna 42 may be controlled by beamforming device 41. For this purpose, interference controller 30 may provide an appropriate setting to beamforming device 41. The control of the beamforming device 41 may be also based on the monitored frequency spectrum.

Figure 3:
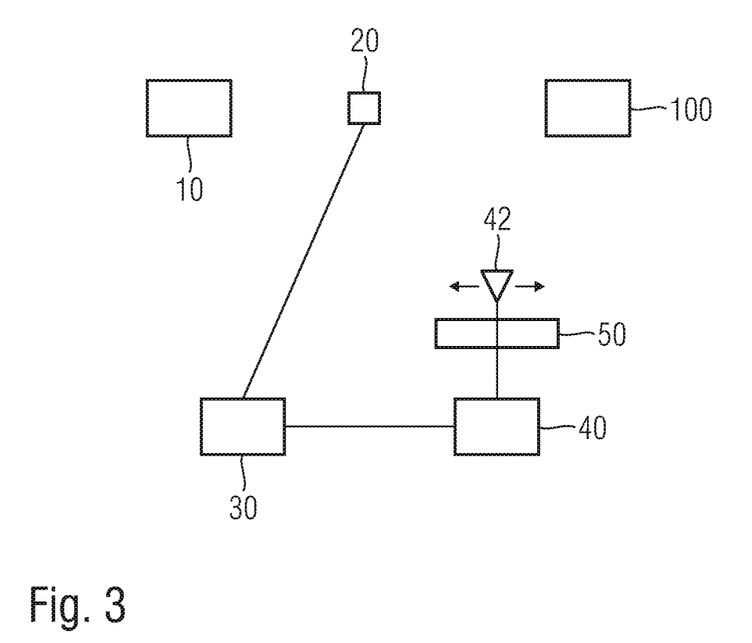
FIG. 3 shows a block diagram of a test system according to still another embodiment.

FIG. 3 shows a further embodiment of a test system 1. The test system 1 according to FIG. 3 mainly corresponds to the previously described embodiments. Furthermore, as can be seen in FIG. 3, interfering device 40 or at least an antenna for emitting interference signals such as antenna 42 may be arranged on a moving platform 50. For example, moving platform 50 may be a moveable structure comprising one or more axes for moving around interfering device 40 or antenna 42. For example, interfering device 40 or antenna 42 may be moved around along one or more longitudinal directions. Additionally or alternatively, interfering device 40 or antenna 42 may be rotated around one or more axes.

Furthermore, moving platform 50 may be highly moveable platform such as an airplane, a quadrocopter or a drone. In this way, interfering device 40 may be moved around in a three-dimensional space around the device under test 100. However, interfering device 40 may be also moved around on a vehicle such as a car or a truck. Any other moveable platform 50 may be possible, too.

Figure 4:
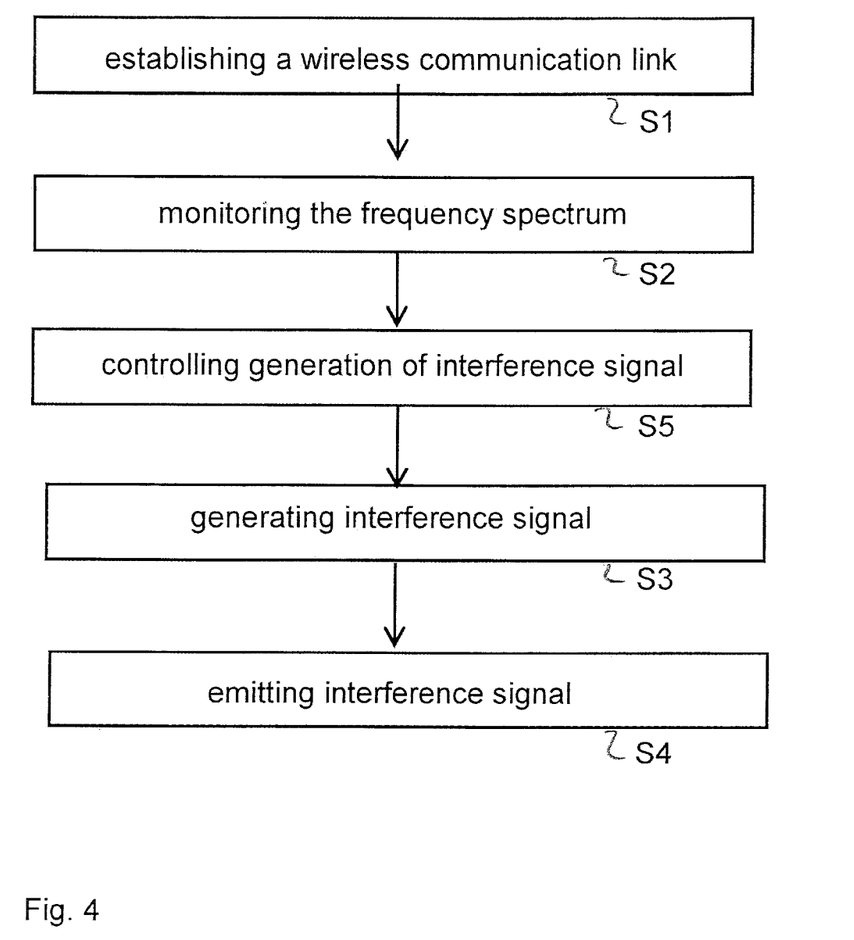
FIG. 4 shows a flow diagram of a test method according to an embodiment of the present invention.

FIG. 4 shows a flowchart of a test method for testing a device under test 100. The test method comprises a step S1 of establishing a wireless communication link between device under test 100 and a test device 10. In a step S2, a frequency spectrum is monitored in a predefined frequency band. The monitoring of the frequency spectrum may be performed by a spectrum measurement device 20, for example a spectrum analyzer. In step S3, an interference signal is generated. The interference signal may be generated, for example by an interfering device. In step S4, the interference signal is emitted to the device under test 100. In step S5, the generation of the interference signal is controlled. In particular, the generation of the interference signal may be controlled based on the monitored frequency spectrum. The controlling of the generation may be performed by an interference controller.

The predefined frequency band on which the frequency spectrum is monitored may correspond to a specific frequency band of a communication standard, for example GSM, UMTS, LTE, 5G, or Bluetooth, WIFI, ZIGBEE etc. Any other upcoming, known or proprietary communication protocol may be possible, too.

The frequency spectrum which is monitored by the spectrum measurement device 20 may be a frequency spectrum which is received or emitted by the test device. Additionally or alternatively, it may be possible to monitor the frequency spectrum which is received or emitted by the device under test.

In particular, the generated interference signal may be a modulated interference signal. Furthermore, the interference signal may comprise noise. Preferably, the interference signal does not relate to a continuous wave signal.

The controlling of the generation of the interference signal may comprise controlling, for example a frequency, an occurrence, a bandwidth or a signal level of the interference signal.

The generated interference signal may be emitted by an antenna or antenna system. In particular, an antenna beam of the antenna for emitting the interference signal may be controlled, for example by a beamforming device. Beamforming of the antenna beam for emitting the interference signal may be controlled, for example, based on the monitored frequency spectrum.

Furthermore, the method may comprise moving around the interfering device 40 or at least an antenna for emitting the interference signal around by a moveable platform.

Summarizing, the present invention relates to testing a device under test via a wireless communication link. When testing the device under test, an interference signal may be applied to the test scenario. The generation of the interference signal may be controlled based on a monitoring of a frequency spectrum in the test scenario, in particular a frequency spectrum at the device under test. In this way, a more realistic test scenario can be achieved.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon re-viewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not in-tended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

What is claimed:

1. A test system for testing a device under test, the test system comprising:

a test device for establishing a wireless communication link with the device under test through a first transmission path;

a spectrum measurement device for measuring a signal at the device under test or at the test device, and monitoring a frequency spectrum of the measured signal in a predefined frequency band;

an interfering device for generating an interference signal and emitting the interference signal to the device under test as a wireless signal via a second transmission path which is different from the first transmission path; and an interference controller for controlling the generation of the interference signal by the interfering device using a feedback loop for dynamically adapting the generation of the interference signal based on the frequency spectrum monitored by the spectrum measurement device, wherein the spectrum measurement device comprises a spectrum analyzer, a signal analyzer or an oscilloscope, and wherein the spectrum measurement device comprises a probe or antenna for measuring the signal, or the spectrum measurement device is configured to measure the signal via wired connection between the spectrum measurement device and the test device or the device under test.

2. The test system of claim 1, wherein the predefined frequency band corresponds to a specific frequency band of a communication standard.

3. The test system of claim 1, wherein the spectrum measurement device is configured to monitor a frequency spectrum of a signal received or emitted by the test device.

4. The test system of claim 1, wherein the spectrum measurement device is configured to monitor a frequency spectrum of a signal received or emitted by the device under test.

5. The test system of claim 1, wherein the interfering device is configured to generate a modulated interference signal.

6. The test system of claim 1, wherein the interference controller is configured to control at least one of a frequency, an occurrence, a bandwidth, or a signal level of the interference signal generated by the interfering device.

7. The test system of claim 1, comprising an antenna for emitting the generated interference signal to the device under test, and
  a beamforming device for controlling a beamforming of the antenna emitting the generated interference signal.

8. The test system of claim 7, wherein interference controller is configured to control the beamforming of the beamforming device based on the monitored frequency spectrum.

9. The test system of claim 1, comprising a moveable platform for carrying the interfering device.

10. A test method for testing a device under test, the test method comprising:
  establishing a wireless communication link between a test device and the device under test through a first transmission path;
  measuring a signal at the device under test or at the test device;
  monitoring a frequency spectrum of the measured signal in a predefined frequency band by a spectrum measurement device;
  generating an interference signal by an interfering device;
  emitting the interference signal to the device under test by the interfering device as a wireless signal via a second transmission path which is different from the first transmission path; and
  controlling, by an interference controller, the generation of the interference signal by the interfering device uses a feedback loop for dynamically adapting the generation of the interference signal based on the monitored frequency spectrum,
  wherein the spectrum measurement device comprises a spectrum analyzer, a signal analyzer or an oscilloscope, and
  wherein the signal is measured by a probe or antenna of the spectrum measurement device, or the signal is measured via wired connection between the spectrum measurement device and the test device or the device under test.

11. The method of claim 10, wherein the predefined frequency band corresponds to a specific frequency band of a communication standard.

12. The method of claim 10, wherein monitoring the frequency spectrum comprises monitoring a frequency spectrum of a signal received or emitted by the test device.

13. The method of claim 10, wherein monitoring the frequency spectrum comprises monitoring a frequency spectrum of a signal received or emitted by the device under test.

14. The method of claim 10, wherein generating interference signals comprises generating a modulated interference signal.

15. The method of claim 10, wherein generation of the interferences is controlled based on at least one of a frequency, an occurrence, a bandwidth, or a signal level of the interference signal.

16. The method of claim 10, the generated interference signal is emitted to the device under test by an antenna, and
  the method comprises controlling a beamforming of a beam of the antenna emitting the generated interference signal.

17. The method of claim 16, wherein the beamforming is controlled based on the monitored frequency spectrum.

18. The method of claim 10, comprising carrying the interfering device by a moveable platform.

* * * * *